United States Patent [19]
Giansante

[11] Patent Number: 5,471,575
[45] Date of Patent: Nov. 28, 1995

[54] INTERACTIVE PARAMETER DRIVEN ITERATIVE FINANCIAL SPREADSHEET ANALYSIS WITH CONTEXT AND LAYOUT SENSITIVE HELP SCREEN

[75] Inventor: Joseph E. Giansante, Mountain View, Calif.

[73] Assignee: Home Equity Software, Inc., Mountain View, Calif.

[21] Appl. No.: 816,892

[22] Filed: Jan. 3, 1992

[51] Int. Cl.⁶ .................................................. G06F 17/21
[52] U.S. Cl. .......................................... 395/144; 395/161
[58] Field of Search ........................... 395/161, 144, 395/145, 146, 147, 148, 152, 153, 154, 155, 157, 158; 364/408, 419.1

[56] References Cited

U.S. PATENT DOCUMENTS

| | | | |
|---|---|---|---|
| 4,891,770 | 1/1990 | Hollett | 395/144 X |
| 4,989,141 | 1/1991 | Lyons et al. | 364/408 |
| 4,992,939 | 2/1991 | Tyler | 364/408 X |
| 5,058,009 | 10/1991 | Yoshino et al. | 364/408 |
| 5,122,972 | 6/1992 | Richards et al. | 395/157 |
| 5,148,365 | 9/1992 | Dembo | 364/408 X |
| 5,155,806 | 10/1992 | Hoeber et al. | 395/157 |
| 5,157,768 | 10/1992 | Hoeber et al. | 395/157 |
| 5,179,654 | 1/1993 | Richards et al. | 395/157 |
| 5,189,608 | 2/1993 | Lyons et al. | 364/408 |
| 5,195,172 | 3/1993 | Elad et al. | 395/50 |
| 5,287,448 | 2/1994 | Nichol et al. | 395/157 X |
| 5,317,688 | 5/1994 | Watson et al. | 395/161 |
| 5,339,392 | 8/1994 | Risberg et al. | 395/161 |

OTHER PUBLICATIONS

Campbell, Quattro Pro Handbook, 1990 pp. 6–7, 28–31, 66–67, 116–117, 144–145, 292–293, 334–337, 354–355, 376–381, 388–389, 543–547.

Albrecht, Teach Yourself GW Basic, 1990 pp. 18, 64.

Symantec, Timeline User Manual, 1990 pp. 16–14 & 16–15.

Mobley Matrix Intl, The Mobley Matrix Operations Manual, 1989 pp. P–1 to P–6, R–20, R–21.

Acerson, WordPerfect Series 5 The Complete Reference, 1988 pp. 231, 428.

WealthStarter with Charles J. Givens User's Guide. Reality Technologies, Limited.

*Primary Examiner*—Heather R. Herndon
*Assistant Examiner*—Anton W. Fetting
*Attorney, Agent, or Firm*—Townsend and Townsend Khourie and Crew

[57] ABSTRACT

A financial analysis system for mathematically modeling an investment on a computer provides an improved computer user interface and a help method for teaching a user how to use the analysis system and for explaining the meaning of items on the screen. An investment term is broken up into two or more incremental periods and unique parameters may be associated with each incremental period so as to allow for the modeling of discrete events and permit varying of input assumptions of one or more incremental periods. In accordance with this scheme, results are displayed with each incremental period having its associated result or results. A method for displaying help text to explain the purpose, function and ordering of items displayed in a computer financial analysis system is disclosed. The help text is visually associated with an item that is displayed in context on the screen. Help text is automatically displayed in a predetermined sequence to explain items on the screen and to illustrate the logical flow of calculations performed on the items. Different help text may be displayed when the value of an item changes.

8 Claims, 15 Drawing Sheets

| Assumptions Screen #4 OF 6 | Quick Tour -- A Simple Example | | | | BUYING YOUR HOME |
|---|---|---|---|---|---|
| | SALARY & RETIREMENT DATA | | | | |
| | Year 1 | Year 2 | Year 3 | Year 4 | Yr 5-10 |
| Current Salary ($/yr) | 48,000 | | | | |
| Salary Increase (%/yr) | | 5.0 | 15.0 | 5.0 | 5.0 |
| Other Income ($) | | 0 | 0 | 0 | 0 |
| FICA Percent (%) | 7.5 | | | | |
| FICA Maximum ($) | 3,500 | | | | |
| Retirement Plan Contribution - Percent of Salary (%) | | | | | 0.0 |
| Plus Fixed Amount Contribution ($) | | | | | 2,000 |
| Tax Deductible Portion of Contribution (%) | | | | | 100.0 |

PGDN=Next Assumptions Screen  PGUP=Previous Screen  HOME=First Screen
F1=Help   ←→=Change Data Item   F4=Results Screens   ESC=Analyze Menu

FIG. 5.

| Results Screen #1 OF 8 | | New File (BYH Default File) | | | | BII:40 YOUR HOME |
|---|---|---|---|---|---|---|
| | | INVESTMENT ANALYSIS | | | | |
| | Year 1 | Year 2 | Year 3 | Year 4 | Year 5 | |
| CASH INVESTMENT ACCT: | | | | | | |
| Cash, Start of Year | 32,000 | 13,942 | 14,895 | 20,317 | 29,505 | |
| Less: Closing Cash | (17,813) | | | | | |
| Plus: Net Savings | (245) | 953 | 5,421 | 9,188 | 10,714 | |
| Cash, End of Year | 13,942 | 14,895 | 20,317 | 29,505 | 40,219 | |
| HOME EQUITY ACCOUNT: | | | | | | |
| Home Market Value | 135,625 | 147,153 | 159,661 | 173,232 | 187,957 | |
| Less: Commissions | (8,138) | (8,829) | (9,580) | (10,394) | (11,277) | |
| Mortgage Balances | (111,937) | (111,312) | (110,618) | (109,847) | (108,992) | |
| Prepay Penalty | (1,119) | (1,113) | (1,106) | (1,098) | (1,090) | |
| Net Cash From Sale | 14,431 | 25,899 | 38,357 | 51,893 | 66,598 | |
| Ending Total Cash | 28,374 | 40,794 | 58,674 | 81,398 | 106,817 | |

PGDN=Next Results Screen  PGUP=Previous Screen  HOME=First Screen
F1=Help Tutor   ←→ =Change Year   F3=Assumptions Screens  ESC=Analyze Menu

FIG. 6.

```
Results          New File (BYH Default File)                          BII:40
Screen                                                                YOUR
#1 OF 8             INVESTMENT ANALYSIS                               HOME
                                                                     ___
CASH INVESTMENT ACCT:  Year 1    Year 2    Year 3    Year 4    Year 5
Cash,                                                          9,505  ←323
Less:                                                          0,714
Plus:                                                          0,219  ←325

┌──────────────────────────────────────────────────────────┐
Cash,  INVESTMENT ANALYSIS RESULTS SCREEN               7,957
HOME                                                        1,277)
Home  BYH was designed to calculate your "cash-on-cash" return  8,992)
Less: on investment, rather than confuse you with "net present 1,090)
Mort  value" or "internal rate of return" concepts.
Prep
      This "cash-on-cash" return shows you, given your initial
Net C cash on hand, how much cash you will eventually have    6,598
      when you re-sell the home at some future point in time.

PgDn = Next Screen          ESC = Exit Help
  └──────────────────────────────────────────────────────────┘

Ending Total Cash   28,374   40,794   58,674   81,398   106,817

PGDN=Next Results Screen    PGUP=Previous Screen      HOME=First Screen
F1=Help Tutor    ← → = Change Year   F3=Assumptions Screens   ESC=Analyze Menu
```

*FIG. 7.*

Results                    New File (BYH Default File)                              BII:41
Screen                        ────── INVESTMENT ANALYSIS ──────                     YOUR
1 OF 8                                                                             HOME
                    361
                     ↓     Year 1    Year 2     Year 3     Year 4     Year 5
CASH INVESTMENT ACCT: ↙359
Cash, Start of Year         000      13,942     14,895     20,317     29,505
Less: Closing Cash          813)
Plus: Net Savings           245)        953      5,421      9,188     10,714
                      359
Cash, End of Year  362      942     14,895     20,317     29,505     40,219

HOME EQUITY ACCOUNT:                                                      353      357
Home Market Value           625    147,153    159,661    173,232    187,957 ↙    ↙
Less:                                                                      (1,277)
Mort                                                                       8,992)
Prep                                                                      (1,090)
Net C                                                                      6,598
Endin                                                                      6,817

┌─────────────────────────────────────────────────────────────┐
│ BYH monitors your cash in two accounts. The first is the    │
│ CASH INVESTMENT ACCOUNT, which continually accumulates      │
│ all of your excess cash (and provides a measure of your     │
│ liquidity). The second is the HOME EQUITY ACCOUNT, which    │
│ shows you the net cash you will receive upon the ultimate   │
│ sale of the home.                                           │
└─────────────────────────────────────────────────────────────┘

PgDn, PgUp = Next, Previous Screen         ESC = Exit Help
PGDN=
F1=Help Tutor    ←→ =Change Year    F3=Assumptions Screens    ESC=Analyze Menu

FIG. 8.

| Results Screen #1 OF 8 | New File (BYH Default File) | | | | | BII:42 YOUR HOME |
|---|---|---|---|---|---|---|
| | INVESTMENT ANALYSIS | | | | | |
| | Year 1 | Year 2 | Year 3 | Year 4 | Year 5 | |
| CASH INVESTMENT ACCT: | | | | | | |
| Cash, Start of Year | 32,000 | 13,942 | 14,895 | 20,317 | 29,505 | |
| Less: Closing Cash | (17,813) | | | | | |
| Plus: Net Savings | (245) | 953 | 5,421 | 9,188 | 10,714 | |
| Cash, End of Year | 13,942 | 14,895 | 20,317 | 29,505 | 40,219 | |
| HOME | | | | | | 359 |
| Home | | | | | | (7,957) |
| Less: Mort | | | | | | (1,277) |
| Prep | | | | | | (8,992) |
| Net C | | | | | | (1,090) |
| Endin | | | | | | 5,598 |
| | | | | | | 6,817 |

Starting with the CASH INVESTMENT ACCOUNT for Year 1, we see that you initially have $ 32,000 available to make the downpayment and pay closing costs.

These "Cash, Start of Year" funds for Year 1 consist of your total marketable assets (such as CDs, bank accounts, stocks, bonds, mutual funds, etc.), as well as any cash received from the sale of your current home.

PgDn, PgUp = Next, Previous Screen      ESC = Exit Help

PGDN=Next Results Screen      PGUP=Previous Screen      HOME=First Screen
F1=Help Tutor    ←→ =Change Year      F3=Assumptions Screens      ESC= Analyze Menu

*FIG. 9.*

Results  New File (BYH Default File)                                    BII: 42
Screen                                                                  YOUR
1 OF 8              INVESTMENT ANALYSIS                                HOME Year 1      Year 2     Year 3     Year 4     Year 5
CASH INVESTMENT ACCT:
Cash, Start of Year    (1,024)    13,942    14,895    20,317    29,505
Less: Closing Cash    (17,813)
Plus: Net Savings       (245)       953     5,421       360     9,188    10,714

Cash, End of Year                14,895    20,317    29,505              40,219

HOME   ┌─────────────────────────────────────────────────────┐
Home   │ Your starting CASH INVESTMENT ACCOUNT value is a negative │  (7,957)
Less:  │ number. Are you sure this is correct? Parentheses         │  (1,277)
Mort   │ around a number such as (1,024) indicate negative numbers.│  (8,992)
Prep   │                                                           │  (1,090)
       │ These "Cash, Start of Year" funds for Year 1 consist of   │   5,598
Net C  │ your total marketable assets (such as CDs, bank accounts, │
       │ stocks, bonds, mutual funds, etc.), as well as any cash   │   6,817
Endin  │ received from the sale of your current home.              │
       │                                              ESC = Exit Help │
       └─────────────────────────────────────────────────────┘

PgDn, PgUp = Next, Previous Screen

PGDN=Next Results Screen        PGUP=Previous Screen     HOME=First Screen
F1=Help Tutor       → =Change Year    F3=Assumptions Screens    ESC=Analyze Menu

FIG. 9A.

Results
Screen
1 OF 8                New File (BYH Default File)                BII:42
                                                                 YOUR
                       INVESTMENT ANALYSIS                        HOME
                  Year 1    Year 2    Year 3    Year 4    Year 5

CASH INVESTMENT ACCT:
Cash, Start of Year   32,000   13,942   14,895   20,317   29,505
Less: Closing Cash   (17,813)
Plus: Net Savings      (245)     953    5,421    9,188   10,714
                    --------  -------  -------  -------  -------
Cash, End of Year    13,942   14,895   20,317   29,505   40,219

HOME                                                         367
Home   ┌─────────────────────────────────────────────┐    (7,957)
Less: Mort │ Next, "Closing Cash" of $ 17,813 is subtracted from │  (11,277)
Prep  │ your starting cash, consisting of the downpayment, any │  (3,992)
      │ points paid on the 1st mortgage, net moving expenses,  │  (1,090)
Net C │ and other closing costs. The "Closing Cash" is shown   │  ───────
      │ in detail on the "MOVE-IN" CASH REQUIREMENTS screen.  │   5,598
Endin │                                                      │   6,817
      │    PgDn, PgUp = Next, Previous Screen    ESC = Exit Help │
      └─────────────────────────────────────────────┘

PGDN=Next Results Screen    PGUP=Previous Screen      HOME=First Screen
F1=Help Tutor    ← =Change Year    F3=Assumptions Screens    ESC=Analyze Menu

*FIG. 10.*

Results                 New File (BYH Default File)                              B11.42
Screen                                                                           YOUR
1 OF 8                    ═══ INVESTMENT ANALYSIS ═══                           HOME Year 1      Year 2      Year 3      Year 4      Year 5

CASH INVESTMENT ACCT:
 Cash, Start of Year    32,000      13,942      14,895      20,317      29,505
 Less: Closing Cash    (17,813)  371
 Plus: Net Savings       (245)        953       5,421       9,188      10,714

Cash, End of Year       13,942      14,895      20,317      29,505      40,219

HOME                ┌─────────────────────────────────────────────┐  369
 Home               │ During the year, your "Net Savings" of $ (245)│  (7,957)
 Less: Mort         │ are added to the CASH INVESTMENT ACCOUNT, calculated │ (11,277)
 Prep               │ as your total income less your mortgage, taxes, retire- │ (8,992)
                    │ ment, household, auto, etc. expenses. If "Net Savings" │ (1,090)
                    │ are negative, the value is shown in parentheses and is │
 Net C              │ DEDUCTED from the account.                  │   5,598
                    └─────────────────────────────────────────────┘
 Endin                                                                           6,817

PgDn, PgUp = Next, Previous Screen       ESC = Exit Help

PGDN=Next Results Screen      PGUP=Previous Screen       HOME=First Screen
F1=Help Tutor    ← → =Change Year    F3=Assumptions Screens    ESC=Analyze Menu

FIG. 11.

Results
Screen
1 OF 8

New File (BYH Default File)    BII:43
                                YOUR
INVESTMENT ANALYSIS             HOME

|  | Year 1 | Year 2 | Year 3 | Year 4 | Year 5 |
|---|---|---|---|---|---|
| CASH INVESTMENT ACCT: | | | | | |
| Cash, Start of Year | 32,000 | 13,942 | 14,895 | 20,317 | 29,505 |
| Less: Closing Cash | (17,813) | | | | |
| Plus: Net Savings | (245) ⟵375 | 953 | 5,421 | 9,188 | 10,714 |
| Cash, End of Year | 13,942◀ | 14,895 | 20,317 | 29,505 | 40,219 |
| HOME EQUITY ACCOUNT: | | | | | |
| Home | | | | | 7,957 |
| Less: Mort | | | | | 11,277) |
| Prep | | | | | 8,992) |
| | | | | | 1,090) |
| Net C | | | | | 5,598 |
| Endin | | | | | 6,817 |

↗ 373

Thus, at the end of Year 1, you have $ 13,942 in
your CASH INVESTMENT ACCOUNT. If this "Cash, End of Year"
is negative IN ANY YEAR, it means that at some time during
that year you became insolvent, i.e. you had insufficient
cash to meet your total expenses. This occurs when your
total income plus starting cash is less than your total
expenses for that year.

PgDn, PgUp = Next, Previous Screen    ESC = Exit Help

PGDN=          ⟶ =Change Year    F3=Assumptions Screens    ESC=Analyze Menu
F1=Help Tutor

Results Screen #1 OF 8

New File (BYH Default File)　　　BII.:46 YOUR HOME

INVESTMENT ANALYSIS

|  | Year 1 | Year 2 | Year 3 | Year 4 | Year 5 |
|---|---|---|---|---|---|
| CASH INVESTMENT ACCT: |  |  |  |  |  |
| Cash, Start of Year | 32,000 | 13,942 | 14,895 | 20,317 | 29,505 |
| Less: Closing Cash | (17,813) |  |  |  |  |
| Plus: Net Savings | (245) | 953 | 5,421 | 9,188 | 10,714 |
| Cas... |  |  |  |  | 40,219 |
|  |  |  |  |  | 187,957 |
|  |  |  |  |  | (11,277) |
|  |  |  |  |  | 108,992) |
|  |  |  |  |  | (1,090) |
| Net Cash From Sale | 14,431 | 25,899 | 38,357 | 51,893 | 66,598 |
| Ending Total Cash | 28,374 | 40,794 | 58,674 | 81,398 | 106,817 |

> Now, we can summarize the "cash-on-cash" return on your home purchase as follows: You started with $ 32,000 in cash, then you purchased and operated a home for 4 years, and you finally ended up with $ 81,398 in cash.
>
> PgUp = Previous Screen　　ESC = Exit Help PGDN=Next Results Screen　　PGUP=Previous Screen　　HOME=First Screen
F1=Help Tutor　　← =Change Year　　F3=Assumptions Screens　　ESC=Analyze Menu

INTERACTIVE PARAMETER DRIVEN ITERATIVE FINANCIAL SPREADSHEET ANALYSIS WITH CONTEXT AND LAYOUT SENSITIVE HELP SCREEN

BACKGROUND OF THE INVENTION

Field of the Invention

This invention relates generally to the field of computer financial analysis systems and more specifically to a user interface for such a system.

Current computer financial analysis systems allow a user to input personal financial data such as salary, expenses, assets, and investments which represent the user's initial financial state. The system will then output predictions of the user's future financial status based on mathematical models. Financial analysis systems typically analyze mortgage refinancing, loan amortization, renting or leasing versus buying a home, retirement planning, investment analysis and achieving financial goals. The input of the financial analysis system is typically a set of numbers. The output of the system may be a single number or it may be a table of numbers or a chart or graph.

The difficulty in designing a financial analysis system for a personal or home user is that in order to provide an accurate analysis, many figures have to be both entered by the user and interpreted by the user as output by the computer. Often the user is confronted with an entire display screen filled with numbers and short, often abbreviated, descriptive headings in both the input and output screens. If the user is unfamiliar with the names and functions of each of the numbers in the display, it will prevent the user from correctly and efficiently using the financial analysis system, and more seriously, will lead to incorrect conclusions about the user's financial state of affairs.

Traditional financial analysis systems use various methods to explain to the user the purpose of items on the screen. One method is called "hypertext" which allows a user to "point" to an item on the screen, for example, by using a cursor controlled by a mouse or by highlighting the items through keyboard selection. After an item is pointed to, the user presses a help button and a paragraph or two explaining the item, the item's purpose and function pops up onto the display screen. This help text remains on the screen until the user presses a keyboard or mouse button whereupon the help text disappears and the user is returned to the initial display. The user can proceed to highlight another item to obtain more help text for any of the items on the screen.

A problem with prior art systems is that the help text, when displayed, overlays some initial screen information which would be helpful to the user in understanding the function of the item. Sometimes, even the item itself is overlayed so that the user loses visual reference to the item. Other systems remove the initial display completely and present the user with a completely new screen containing the help text. When the user decides to go back to the initial display, the help text is removed and the initial display is restored.

With this latter technique, the user loses all visual reference to the item which is being explained by the help text. Such visual reference is important when the item is one of many numbers shown on the screen and the number's placement, relative to other displayed information, is helpful in understanding its function.

The second problem with the hypertext method of providing help information is that a sequence or "flow" of help information between items is not established. This is because it is the user who is selecting the items to be explained and the user may randomly or haphazardly choose to have items explained in a sequence which is not representative of the role of the items in a computation. For example, in the calculation of A+B=C, the user may first select an explanation of A and then an explanation of C, which probably does not provide as good an understanding of the computation as if A and B were explained before C was explained.

Other help methods are even less adequate in explaining the function of items in a financial analysis system display screen. These methods often provide information about items in a manual-like format where the function of items is discussed as if the user were reading a textbook and turning pages by pressing keyboard or mouse buttons. The text in these methods often occupies the whole of the screen so that the user is provided with no visual reference of the items whatsoever.

As mentioned above, financial analysis systems use mathematical models to predict the effect that various factors will have on the user's financial status over the term of an investment. Every attempt is made to simplify the use of the system by keeping the number of inputs from the user low and by presenting the output as a single number or a graph. However, this simplification is at a sacrifice in the flexibility of the financial analysis system as the user is only allowed to specify their financial status at the beginning of the term and the system calculates their financial status at the end of the term. This is in contrast with the real world where an individual's financial situation is affected on a day-to-day basis throughout the term of the investment.

For example, assuming a user trying to simulate a one-year investment, a traditional financial analysis system would have the user specify starting parameters such as the amount of investment and rate of return and then use these parameters to calculate the accrued value at the end of one year. This does not take into account the possibility that the interest rate may fluctuate within the year. As another example, in a cash flow analysis other one-time events, such as an increase in salary, may occur during the investment term being modeled. The math models used in current financial analysis systems make it difficult to handle discrete events, that is, parameters whose values change during the course of the investment term.

Financial analysis systems on the market today generally use a "present value" or "internal rate of return" analysis methodology. These methods operate, respectively, by calculating the present value of the stream of cash flows or by calculating the internal rate of return associated with the cash flow stream. Such methods are well-known in the art.

In each method a discount rate may be specified by the user; however, this discount rate is maintained constant throughout the calculation. This is not an accurate reflection of actual discount rates which can fluctuate with time. Moreover, these math models based on present value or internal rate of return provide no means of modeling discrete events such as "windfall" capital realizations, one-time or intermittent expenses, or other discrete events which would affect a user's income in a non-continuous manner.

Further, the use of present value or internal rate of return analysis methodologies is confusing to the average user of a financial analysis system since these methodologies do not represent any actual quantity of cash held by the user at any time during the investments. The internal rate of return approach suffers from an additional shortcoming in that it gives no weight to the relative "size" of the investment. For example, an investment of $1,000 which returns $1,500 in five years has the same internal rate of return as an investment of $100,000 returning $150,100, even though in the second case the amount earned is 100 times larger than the first case. This is because the internal rate of return expresses its result as the ratio of return to investment.

SUMMARY OF THE INVENTION

Accordingly, the present invention provides a means by which help text may be displayed on a display screen in a financial analysis system executing on a computer. The help text describes an item on the screen and a pointer or arrow connects the help text with the item being described.

The present invention implements a help tutor which can automatically display help text in a predetermined sequence to explain items on the screen and illustrate the logical flow of the calculations performed on the items. Different help text may be displayed for different values of an item. For example, if the item is a number and its value is positive then a first help text can be displayed, if the value of the item is negative a second help text can be displayed. The invention also allows a user to model discrete events such as changes in the investment rate or income and expenditures which occur at selected points during the investment term being modeled, as contrasted with continuous events which may be modeled by an equation with parameters whose values do not change.

BRIEF DESCRIPTION OF THE DRAWINGS

FIG. 5 is a second screen display for allowing the input of additional parameters.

FIG. 6 is a third screen display for outputing results.

FIG. 7 shows the screen display of FIG. 6 with first help text.

FIG. 8 shows the screen display of FIG. 6 with second help text and arrows.

FIG. 9A shows different help text displayed for a different value.

FIG. 9 shows the screen display of FIG. 6 with third help text and an arrow.

FIG. 10 shows the screen display of FIG. 6 with fourth help text and an arrow.

FIG. 11 shows the screen display of FIG. 6 with fifth help text and an arrow.

FIG. 12 shows the screen display of FIG. 6 with sixth help text and an arrow.

FIG. 13 shows the screen display of FIG. 6 with seventh help text and two arrows.

DESCRIPTION OF THE PREFERRED EMBODIMENT

Figure 1:
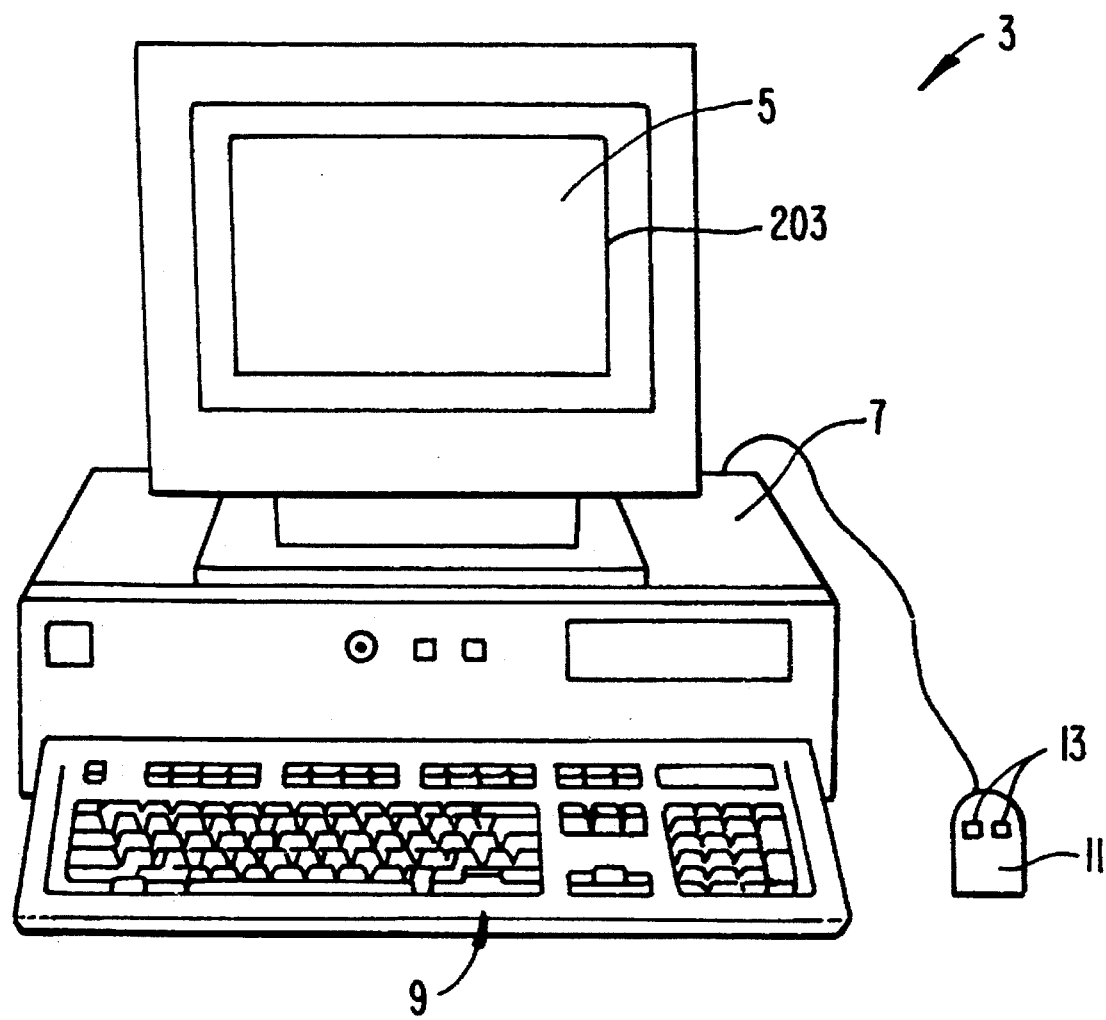
FIG. 1 is an illustration of a computer system.

The present invention is a financial analysis system which allows a user to input an initial set of data representing a financial state or status. The financial analysis system then uses a mathematical model to make predictions about a future financial state. The invention uses a computer system 1 as shown in FIG. 1. Computer system 1 comprises a display 3 having a screen 5. Computer system 1 further comprises a cabinet 7 within which are standard computer components (not shown) such as disk drives, memory, central processor, peripheral adapter cards, etc. Computer system 1 may have user input devices such as a keyboard 9 or a mouse 11. Mouse 11 may have one or more buttons 13.

Figure 2:
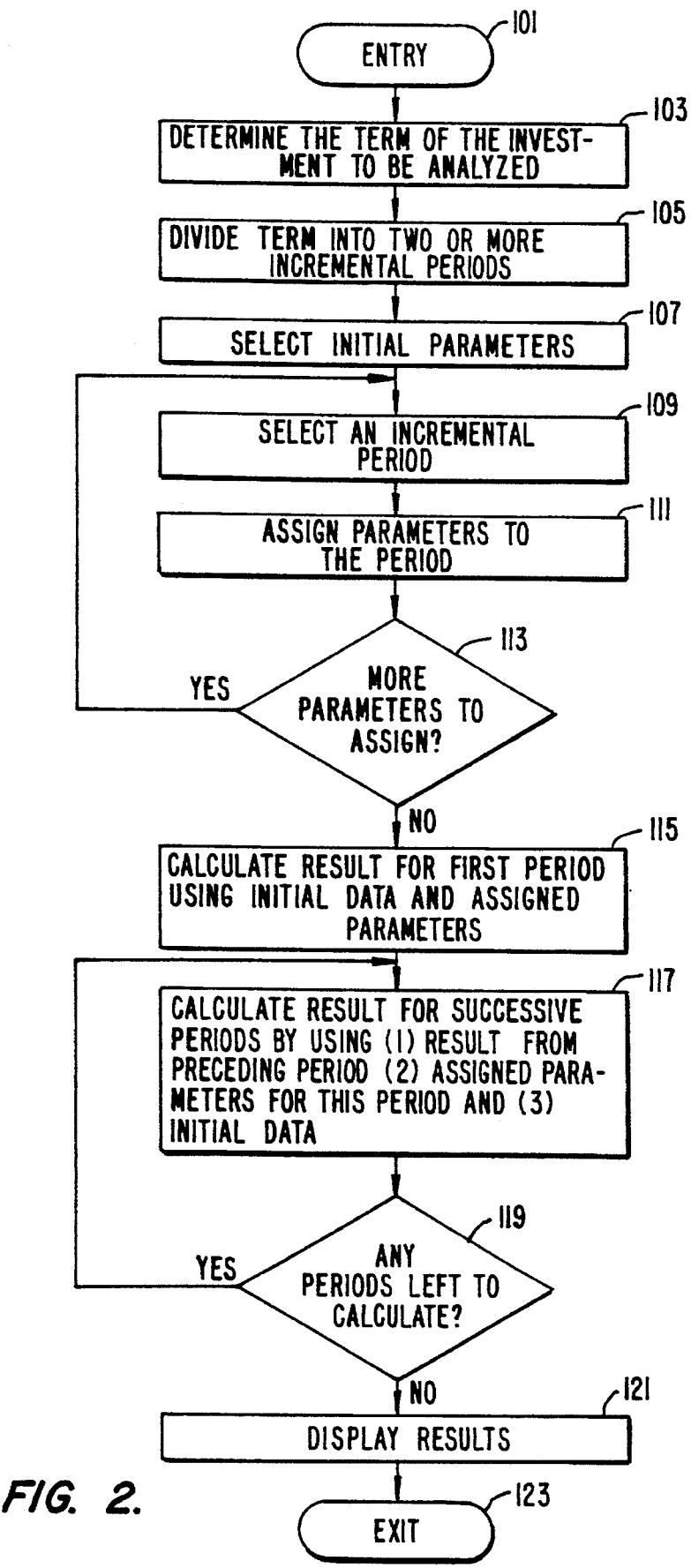
FIG. 2 is a diagram illustrating the logic flow for a method of calculating financial results.

FIG. 2 shows the logical flow of the steps in a method for calculating results based on an initial set of financial data. The method assumes that the financial analysis can be characterized as an investment over a term or fixed period of time. The method further assumes that the user has enough information to accurately define an initial set of data describing the user's present financial situation with respect to the investment. Also, the user must have enough information to characterize the "market forces" such as the rate of home price appreciation.

For example, such a financial analysis would apply to buying a home, where the buyer's current savings and salary are known along with the price of the house and expected expenses in purchasing the house. These values would be part of the initial set of data defining the user's financial state. Other values such as the rate of home price appreciation, interest rate on the mortgage, salary increases, and taxes would be some of the parameters input by the user and used in the math model to calculate the future financial state. The methods described below in reference to FIG. 2 allows the user to take into account one-time factors or factors which change over the term of the analysis because the user may input parameters which are only effective for a short period of time within the overall term of the investment.

In FIG. 2 the method or procedure has an entry point 101. Step 103 determines the term of the investment. Using the purchase of a home as an example, the user may decide to analyze the home purchase over a ten year term. Thus, the term of the investment is set at ten years. Step 105 divides the term into two or more incremental periods. In the example, the ten year term can be conveniently divided into ten one-year incremental periods. In step 107, initial parameters are selected. This can be achieved by having the user input parameters which define the user's initial financial state. Alternatively, the computer system may select pre-stored initial parameters for some or all of the required parameters to define the initial state. This would be useful when the user is first becoming acquainted with the system and desires only to do a "test" run to become familiar with the system. Having the computer select the initial default parameters would also be useful when the user omits inputing one or more necessary parameters as where the user does not have enough information to enter an accurate parameter and desires only that the parameter be a reasonable approximation of the typical value of that parameter.

At step 109 an incremental period is selected. In the home buying scenario, since the investment term is ten years and the incremental period is one year, step 109 would require the selection of one of the ten one-year periods. This step may be performed by the user as where the user desires to enter parameters for a specific year. Step 109 may also be performed by the computer as where the computer is prompting the user to enter parameters for a specified year. In step 111 parameters are assigned to the period selected in step 109. This is typically done by the user who hopefully has enough information to enter accurate parameters. However, if the user chooses not to, or cannot, enter accurate parameters, the computer may use default values as above in the case of using default values to set the initial parameters at step 107.

Where the steps 109 and 111 of respectively selecting incremental periods and assigning parameters to the selected periods are performed by the user, one of the user input devices, such as keyboard 9 or mouse 11 of FIG. 1, may be used. In a preferred embodiment of this invention to be described below, display screen 5 of FIG. 1 would show incremental periods as columns on the screen and would show parameters associated with each column as rows within that column. The user could then, by means of keyboard 9 or mouse 11, move a cursor (not shown) on the screen from parameter to parameter. Moving the cursor horizontally from column to column would achieve step 109 of selecting an incremental period. Moving the cursor vertically from parameter to parameter within the column and modifying the parameter would constitute step 111, that of assigning a parameter to the incremental period. The user would be free to modify each of the parameters indicated by the cursor position by pressing additional buttons on either the keyboard 9 or mouse 11, as, for example, by entering a numerical value using the numbered keys on a typical keyboard. Many workable procedures for achieving steps 109 and 111 are possible and all are considered within the scope of this invention.

Step 113 looks at whether there are more parameters to assign to incremental periods. This decision can be made by requesting the user to indicate whether or not the user desires to enter more parameters. Alternatively, the computer system may prompt the user for parameters until all parameters have been entered. In either case, where there are more parameters to assign, step 109 is again repeated along with subsequent step 111. Note that it is not necessary to first select an incremental period before assigning parameters. In other words, parameters can be entered and then assigned to an incremental period, that is, steps 109 and 111 may be reversed.

At step 115, the result for the first period is calculated using the initial data and parameters assigned to the first period. At step 117, results are calculated for successive incremental periods using the result from a preceding period and any assigned parameters for the successive periods being calculated. Also, at step 117, some of the parameters from the initial data may be used. Step 119 looks to whether there are any periods left with uncalculated results. If so, execution continues at step 117. If there are no periods left to be calculated, execution falls to step 121 where the results are displayed for the user. The method ends at step 123.

The math models used in the analysis require that the incremental period results be calculated sequentially. That is, the calculation for year two in the above sample could not begin until the results were obtained for year one.

Figure 4:
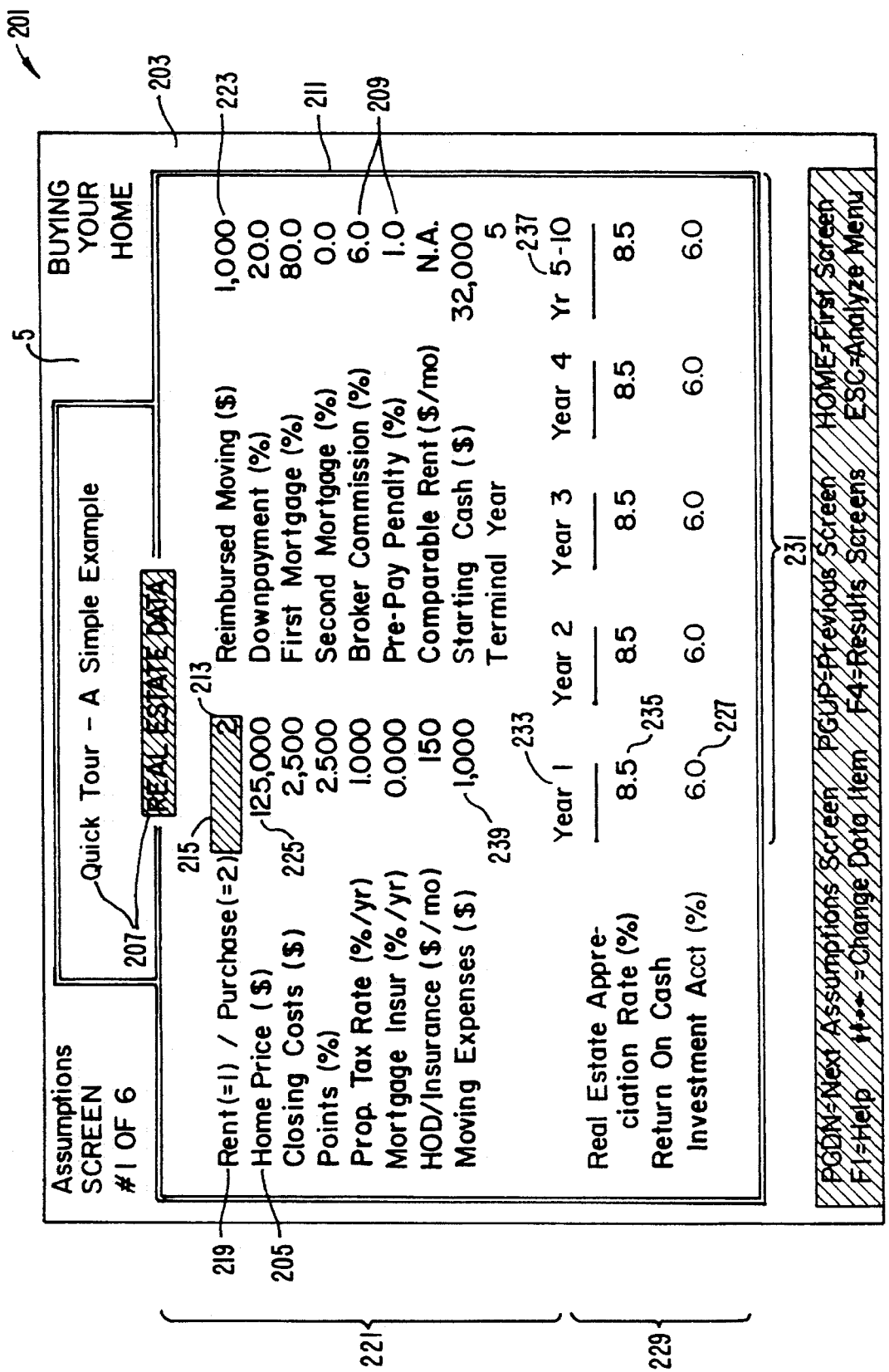
FIG. 4 is a first screen display of the present invention which allows the user to input parameters.

The screen display 201 of FIG. 4 shows a preferred embodiment for accomplishing some of the steps of the method described above in reference to FIG. 2. Screen display 201 is comprised of information on the computer screen 5 of FIG. 1 which is also indicated in FIG. 4. The information on the display screen may be text such as headings 207, numbers or values such as 209 and graphics such as the boundary 211. Display screen boundary 203 shows the limits of the screen 5 upon which information may be displayed.

Items at the top half 221 of display 201 are parameters in the initial set of data for the financial analysis system. The items discussed in connection with a financial analysis system will most likely be numerical values. However, the present invention's method for displaying help text is applicable to other systems in which an item may be a character, word, alphanumeric string, symbol, collection of symbols, or a graphic. The text 219 is a descriptor for value 213. Highlight 215 is a reverse video area which causes value 213 to appear in the illustration as white on black instead of black on white as would be the case where highlight box 215 was not surrounding value 213.

Highlight box 215 may be moved to select different values to be modified. Typically this movement can be achieved with a keyboard such as keyboard 9 of FIG. 1, where dedicated keys such as the arrow keys on the keyboard indicating up, down, right and left may be used. A device such as mouse 11 could also be used to move highlight box 215 in accordance with the mouse movement. Highlight box 215 may be moved from its current position to highlight value 223 by moving the box to the right or it may highlight value 225 by moving the box downwards. Additionally, other methods may be employed to allow "wraparound" of the box to value 227 by moving the box upwards or the box may be allowed to "jump" from value to value. These methods of cursor movement are well known in the art.

Once positioned over a value such as 213, that value may be modified by pressing a key such as the standard "return" or "enter" keys (not shown) on keyboard 9 and then entering a new value by means of numeric keys (not shown) on keyboard 9 of FIG. 1. In this way, step 107 of FIG. 2, that is selecting the initial parameters, may be achieved. Note that in the preferred embodiment screen display 201 only allows the user to select a subset of the initial parameters. The remainder of the initial parameters are on additional screens which may be accessed by using additional keys on keyboard 9 such as "page up" and "page down".

The lower section 229 of screen display 201 presents parameters for incremental periods. The incremental period parameters are shown as columns 231. Each incremental period column has a heading such as 233 and has values such as 235 and 227 arranged in rows under the column heading.

In this analysis the term of investment is ten years and the incremental period is one year. However, only five columns are shown on screen 201. This is because the column with heading 237 pertains to incremental periods for years 5 through 10. Thus, the parameters under heading 237 will be used in calculating the six incremental periods, periods 5 through 10. To select an incremental period, the user positions highlight box 215 within one of the five columns. Parameters are assigned by modifying one of the two values within the column in a manner to analogous to the discussion above for entering parameters for the initial data set. Again, as with the initial parameters, the incremental period parameters may be spread out over more than one screen. In the preferred embodiment, both the initial and incremental parameters are spread over six screens which are accessed by using the "page up" and "page down" keys.

FIG. 5 shows another screen 237 which shows a second set of column headings 239 coinciding with the column heading 231 of FIG. 4. Highlight box 241 is now over value 243 corresponding to the parameter for current salary as indicated by descriptor 249. Note that there are no values for descriptor 249 under columns other than the column for the incremental period for year one. However, the periods other than the year one period do have a parameter absent from year one, namely "salary increase" indicated by descriptor 253. Looking at the column for year one, it is shown that the blank space 245 exists where the corresponding parameter for "salary increase" would be. Thus, it is shown that a given incremental period may or may not use the same parameters as other incremental periods. In the preferred embodiment, moving the highlight box downward would cause the highlight box to move from the value 243 to value 247. Moving the highlight box to the right from its position as shown in FIG. 5 would cause the highlight box to cover value 251.

The above discussion shows how steps 109 and 111 of FIG. 2 may be accomplished. The user may continue to select columns and assign parameters by repeating the above-described steps. The user may indicate that no more parameters are to be assigned by pressing a key on the keyboard such as the "ESCAPE" or "F4" keys. In this way step 113 of FIG. 2 is implemented.

After all parameters have been assigned, computation of the results proceed in accordance with steps 115, 117 and 119 of FIG. 2.

FIG. 6 shows a screen display 301 of the results from the analysis. The results display is presented in columnar form with each column corresponding to the incremental period of one year. In the result screen 301 of FIG. 6, each of the results for the incremental one-year periods may be viewed, although only five periods are shown at any one time. The system accepts a user input such as a right arrow key press from the keyboard to display the results for an additional year. For instance, if the user were to press the right arrow at the screen display as shown in FIG. 6, years 1, 2, 3, 4 and 5 would be replaced with the results for years 2, 3, 4, 5 and 6, respectively. Using the right and left arrow keys, the user can display the results for years one through ten as a display of any five consecutive years at one time.

The ability to input and display parameters and calculate and display results for incremental periods is an advantage of the present invention over prior art systems. This method allows the user to take into account discrete or one-time instances of events which affect their financial status. For example, referring to FIG. 4, values 235 and 227, corresponding, respectively with the real estate appreciation rate and a return on cash investment, can be modified for each of years 1, 2, 3, 4 and 5–10. In this way, the user can take into account a trend such as a projection from a qualified real estate market analyst that the home price appreciation rate will be increasing over the next ten years. The manner of presentation of parameters utilizing incremental periods is self explanatory in that the average lay person understands instantly from looking at the display 201 of FIG. 4 the purpose of the parameters and the effects of inputting yearly variations in the parameters.

Further, the result screen 301 of FIG. 6 is an efficient and concise means of presenting the results of a complicated financial analysis to the user. For example, by looking at the ending total cash results 303, the user can determine the effect of terminating their investment (i.e., selling the home) in each of any of the 10 years. If the user sells the home in year 3, value 307 which shows $58,674 is the amount which the user would realize according to the financial analysis. In prior art systems, in order to obtain information such as that shown in screen 301, a user would typically have to run the investment analysis ten times, once for each of the incremental periods, changing the initial data set each time the analysis is run.

The preferred embodiment of the present invention provides many result parameters in an easily understandable fashion, such as "end of year cash" 305, shown in FIG. 6. This shows the user's assets such as savings accounts and other investments, not including the home investment, and gives the user a clear indication of their ability to maintain the home investment throughout the investment term. As an example, if the values for the end of year cash 305 were progressively decreasing or became negative, it would mean, respectively, that the user was heading towards insolvency or became insolvent. Other prior art financial analysis systems show results plotted on a graph, requiring the user to interpret the gap between two curves which causes an ambiguous result. Also, results in graph form are not as intuitively obvious as simply providing account balances for each incremental period.

Figure 3A:
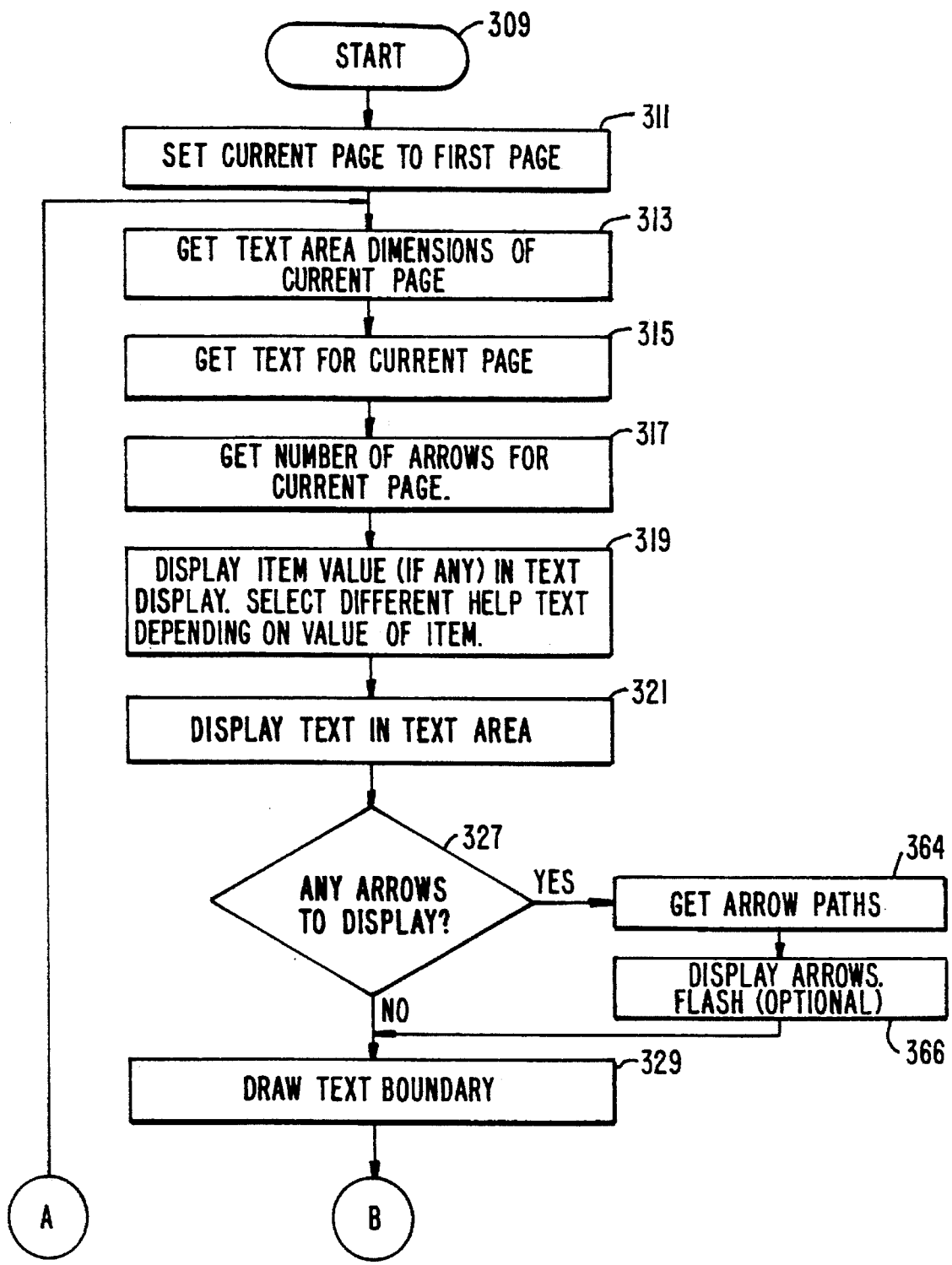
FIGS. 3A and 3B are a diagram illustrating the logic flow for a method to display help text on a computer screen.
Figure 3B:
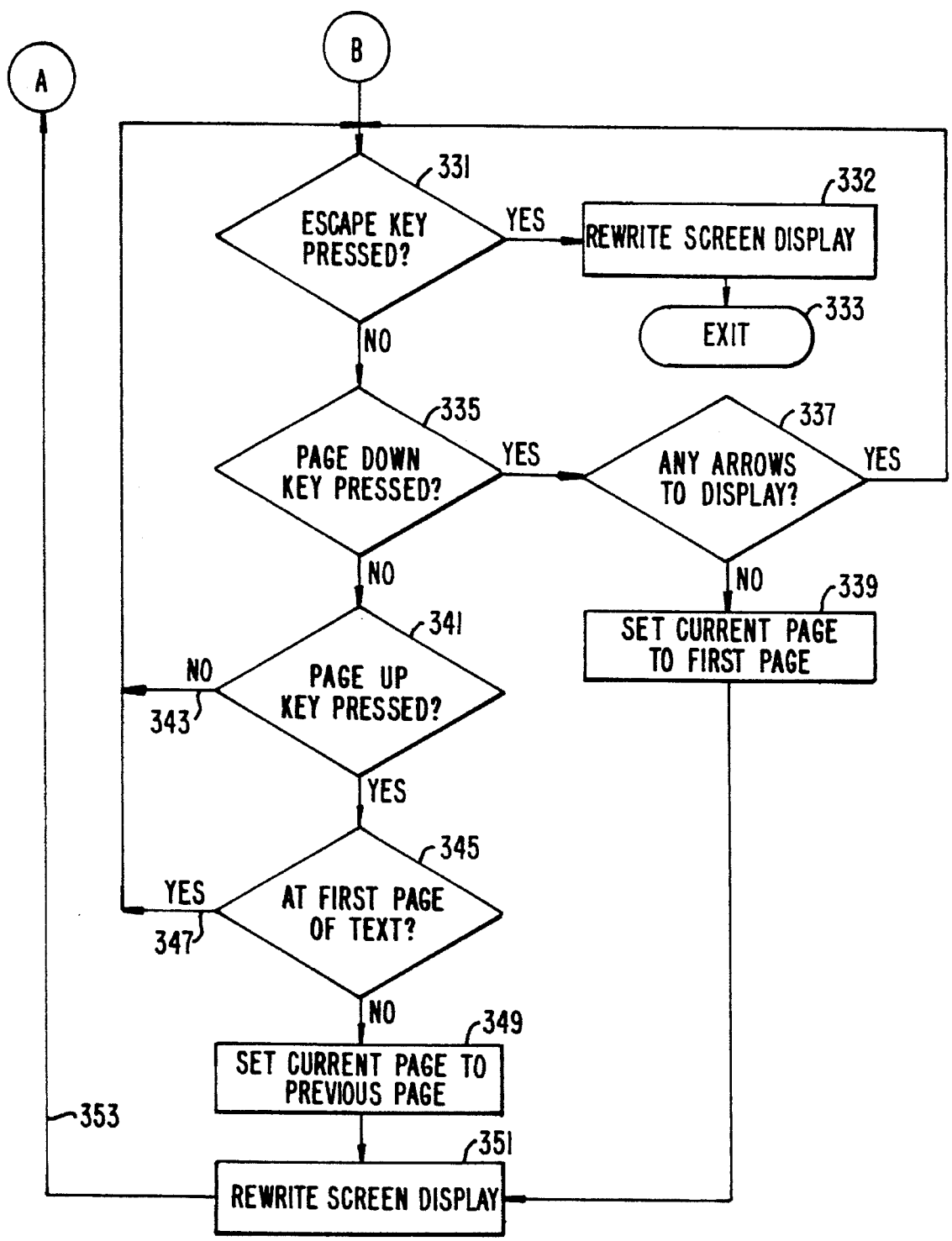

FIGS. 3A and 3B show a logic flow diagram for a method to present help text on a display screen. The display screen initially displays items of information which could comprise text numbers and graphics (initial text). A problem arises when it is necessary to explain, by means of additional text, the meaning of various items on the screen. Often there is not enough area to display the help text and initial text at the same time. Also, when it is desired to explain the "flow" or sequence of actions occurring on the screen, the standard single help text box is inadequate.

FIG. 3A shows entry point 309. It is assumed that at step 309 the display screen is presently displaying information such as shown on screen 301 of FIG. 6. The user could initiate entry into the routine of FIGS. 3A and 3B, for example by pressing the F1 key.

In step 311 of FIG. 3B, the program executing on the computer system will set a variable representing the current page of help text to indicate that the current page of help text is the first page of help text. Step 313 retrieves data from a data structure to obtain the area dimensions of the current page. Step 315 retrieves the text for the current page and step 317 retrieves the number of arrows, if any, for the current page.

The information retrieved in steps 313, 315 and 317 can be contained in a single data structure or multiple data structures. The use of one or more data structures can be implemented in any number of ways known in the art. For example, the text area dimensions can be stored as two sets of XY coordinates, indicating the upper left corner coordinate and the lower right corner coordinate. A parameter which is a pointer to a location in computer memory where the current text resides may be retrieved at step 315 and the number of arrows for the current page could be an integer value. At step 319 the item which the help text is explaining is displayed in the help text box. This can be merely using the item in a sentence which describes the item. Where the item is a number, the use of the number within the help text helps to identify the number being discussed.

At step 319, different help text may be selected according to the value of the number (assuming the item is a number). In the preferred embodiment, one set of help text will be displayed if the number is negative and another set of help text will be displayed if the number is positive. This helps to alert the user to important situations, such as insolvency, which arise due to a change in parameter values for a particular analysis.

Finally, at step 321, the text for the current help page is displayed in the help text area on the screen.

FIG. 7 shows the same initial display as in FIG. 6; however, help text 323 is overlayed onto the initial display as would appear after execution of step 321 of FIG. 3A. At step 327 of FIG. 3A, software executing on the computer would check whether there are any arrows to be displayed. Assuming for the moment that there are no arrows to be displayed, execution proceeds to step 329, which draws a text boundary around the help text as shown by boundary 325 of FIG. 7. At step 331 of FIG. 3B, the user may exit the help tutor mode by pressing the escape key, thus causing the execution to terminate at 333. If the escape key is pressed, the screen display is restored at step 332 and the routine is exited at step 333 so that the user is returned to the display 301 of FIG. 6. The rewrite screen display step 332 will rewrite the screen and restore it to its original display 301 before exiting.

The user may continue on to the next page of help text by pressing the page down key, in which case execution will be routed by step 335 to step 337. Step 337 checks whether the help text being displayed is already at the last page. This would be indicated by the current page counter having a value equivalent to the last page. If that is the case, execution will return to step 331; in other words, the user will not be allowed to proceed to the next help page since there is none.

Assuming at step 337 that the current page counter is not set to the last page, execution proceeds to step 339 and the current page is incremented to the next page. Similar to the pressing of the page down key, the page up key may be pressed by the user. This is checked at step 341. If the page up key has not been pressed at this point, it would mean that neither the escape, page down, or page up keys have been pressed and the user is returned via path 343 back to step 331; that is, the system will continue awaiting one of the key presses, escape, page down, or page up.

Assuming the page up key is pressed at step 341, execution falls to step 345. If the current page counter is at the first page, the user will not be allowed to increment the page and execution returns through path 347 back to step 331. If the current page counter is not set to the first page, then the current page counter is decremented to indicate the previous page of help text at step 349. At step 351 the display screen is rewritten in a manner similar to the rewrite step 332. Execution returns along path 353 to step 313, where the parameters for the new page of help text are retrieved at steps 313, 315 and 317. The new help text is displayed similarly to the discussion above for displaying the first page help text.

Referring to FIG. 7, and assuming the user has pressed the page down key to access the next page of help text, the subsequent display would be as shown in FIG. 8. Note that the page down keypress would have been detected at step 335 of FIG. 3B and a check would have been made at step 337, finding that the current page is not the last page so that the current page would have been incremented to the next page. The first page would have been erased by the rewrite screen display step 351, then execution would have returned to steps 313, 315, and 317 to get the data for displaying the second page of help text and the screen display under the second page of help text would have been saved at step 319. The second page of help text would have been displayed at step 321.

FIG. 8 shows the second page of help text 355 overlying a different part of initial screen display 301 and having a different size. FIG. 8 also shows help text boundary 357, path 359 and arrows 362 and 361. However, at this point at step 327 of FIG. 3, these structures would not yet have been displayed. At step 327 the software checks whether there are any arrows to display. In this case, there are two arrows to display so execution proceeds to step 364 where information indicating the paths of the arrows is obtained. This information would be another data structure which can be implemented in any of a variety of ways known in the art. One such data structure could be a point-to-point list of XY coordinates describing line segments which make up the path.

At step 366 the arrow paths, such as 359 of FIG. 8, are drawn. Also at step 366 the arrow points 362 and 361 are displayed. In a preferred embodiment, the arrow paths and points are flashed on the screen three times in approximately two seconds to direct the user's attention to the items pointed at. Any further method for alerting the user and directing their attention to the items pointed at may be used, such as emboldening the arrow points and paths or further animating the pointing process as by showing the arrows creep up to the pointed items, highlighting the items, etc.

Execution proceeds to step 329 where the text boundary 357 is drawn. After execution of step 329, the screen display will appear as shown in FIG. 8.

The display of FIG. 8 shows that the help text presented in this fashion is an effective method for clearly and simply discussing items on a screen which is already filled with information. The help text of FIG. 8 discusses the items (the cash investment account and the home equity account) while at the same time maintaining a continuous display of the items in context. This is unlike the prior art which replaces the screen being viewed with an entirely new and different screen of information discussing items which appeared on the previously displayed screens. This manner of displaying help text loses both continuity and context. Other prior art systems overlay help text with the initial screen but do not "point" to the items in their initial locations on the screen and do not preserve the context of the items on the screen. Thus, the method of the present invention provides an improved method to explain the results of a financial analysis system.

FIG. 9 shows the display screen after the user has pressed the page down button in the display of FIG. 8. Similar to the above discussion, the display screen has been rewritten from the display of FIG. 8, that is, the help text 355 and associated boundary 357, arrow path 359 and arrow points 362 and 361 have been replaced with the initial text. Then the current page counter was updated to indicate the next page of help text whereupon the data for displaying the new page of help text had been retrieved. Finally, the new help text was displayed. New help text 359 discusses item 361 which is pointed to by a path and an arrow point. Note also that value 363 is restated in the help text for clarity. A subsequent press of the page down key will lead to the display shown in FIG. 10. FIG. 10 shows a new page of help text 367 which is used to describe item 365. FIG. 11 in turn shows help text 369 describing item 371. FIG. 12 shows help text 373 which discusses item 375.

FIG. 9A shows the display screen with a negative value for the "Cash, Start of Year" entry. Accordingly, different help text is displayed at 360.

It can be seen from FIGS. 9 through 12 that the sequence of help pages discusses items which are arranged in a vertical column in a top-to-bottom fashion. That is, a discussion of the items can proceed with attention given to the logical flow of using the items in a calculation in the order that they are displayed on the screen. The item of FIG. 9 is the first item used in a calculation. From this item the item pointed to in FIG. 10 is subtracted. Next the item pointed to in FIG. 11 is subtracted to yield a result as pointed to in FIG. 12. In this manner, not only are the continuity of the display and context of display preserved while the items are discussed in help text, but the items on the screen may be described in regard to the sequence of operations performed on them. This is particularly useful in describing the results of a financial analysis system where values on the screen are often items in a sequential calculation and are best described by showing the order in which the items are combined or used in the calculation. The method of the present invention, therefore, provides a means for providing information to the user much like a teacher standing at a blackboard who points out and explains the purpose, function, and ordering of items on the blackboard.

FIG. 13 is another screen showing a different help text 377. In FIG. 13, the help text 377 is used to described relationships between two items on the screen, that is, value 379 and value 381. This is done by pointing to each value with two separate arrow paths and points. Note that the paths serve to connect the values with the help text, and the help text is positioned on the screen so as to allow both items to be seen in sufficient context with the initial display to make the explanation readily understandable.

The above-described arrangement is merely illustrative of the principles of the present invention. Numerous modifications and adaptations thereof, will be readily apparent to those skilled in the art without departing from the spirit and scope of the present invention.

What is claimed is:

1. A method for displaying help text on a display screen in a computer system, wherein the computer is coupled to a user input device for generating signals in response to the actions of a human user, where said screen initially displays first text having a plurality of items, wherein each item is a numeric value displayed on the display screen, wherein the initially displayed first text and plurality of items describe a mathematical calculation performed by using the items in a fixed order, said method comprising the steps of:

storing a predefined data structure in the computer, wherein the data structure includes references to a plurality of the initially displayed items, wherein the references in the data structure are arranged in a predefined order corresponding to the fixed order of the referenced items;

repeating, in response to signals from the user input device, the following steps to display help text associated with the items referenced by the data structure:

selecting a reference from the data structure in accordance with the ordering of the references in the data structure;

using the computer to select predefined help text corresponding to the item referenced by the selected reference;

using the computer to determine an area on said screen large enough to contain said selected help text;

using the computer to determine a position for the area on said screen, where said position does not cause said area to overlap said item;

displaying said help text within said area;

displaying a linear pointer on said screen, where one end of said pointer is substantially near to said help text and the other end of the pointer is substantially near to said referenced item thereby visually connecting said help text with said referenced item;

displaying the selected help text in the determined position on the screen;

removing the selected help text from the determined position on the screen.

2. The method of claim 1, further comprising the steps of:

displaying, in response to a first signal from the user input device, help text corresponding to the next item in the predetermined order; and displaying, in response to a second signal from the user input device, help text corresponding to the previous item according to the predetermined order.

3. The method of claim 2, wherein the user input device comprises a keyboard with first and second keys, wherein the first signal is generated by a user depressing the first key, wherein the second signal is generated by a user depressing the second key.

4. A method for displaying help text on a display screen in a computer system, the method comprising the following steps performed by the computer system:

displaying an item name on the display screen;

displaying a first quantitative value expressed as a number on the display screen at a first position adjacent to the item name;

selecting first help text associated with the first number;

displaying the selected first help text on the display screen;

displaying a linear pointer on the display screen, wherein one end of the pointer is substantially near to the selected first help text and the other end of the pointer is substantially near to the first quantitative value expressed as a number thereby visually connecting the first selected help text with the first quantitative value expressed as number;

displaying, subsequent to the "displaying a first quantitative value expressed as a number" step, a second quantitative value expressed as a number on the display screen at the first position to replace the first quantitative value expressed as a number, wherein the second quantitative value expressed as a number is different from the first quantitative value expressed as a number;

selecting second help text associated with the second quantitative value expressed as a number;

displaying the selected second help text on the display screen; and displaying a linear pointer on the display screen, wherein one end of the pointer is substantially near to the selected second help text and the other end of the pointer is substantially near to the second quantitative value expressed as a number thereby visually connecting the second selected help text with the second quantitative value expressed as a number.

5. The method of claim 4, wherein the first quantitative value expressed as a number is positive and the second quantitative value expressed as a number is negative.

6. The method of claim 4, wherein one or more of the displayed quantitative value expressed as numbers are input by the user.

7. An apparatus for displaying help text on a display screen in a computer system, wherein said screen initially displays first text having a plurality of items, wherein each item is a numeric value displayed on the display screen, wherein the initially displayed first text having a plurality of items describes a mathematical calculation performed by using the items in a fixed order, the apparatus comprising:

a computer;

a user input device coupled to the computer, wherein the user input device generates signals in response to the actions of a human user;

a storing process executed by the computer system for storing a predefined data structure in the computer, wherein the data structure includes references to a plurality of the initially displayed items, wherein the references in the data structure are arranged in a predefined order corresponding to the fixed order of the referenced items;

a user input handling process executed by the computer system for repeating, in response to signals from the user input device, steps to display help text associated with the items referenced by the data structure, wherein the user input handling process includes a selecting process for selecting a reference from the data structure in accordance with the ordering of the references in the data structure; a help text selecting process for selecting predefined help text corresponding to the item referenced by the selected reference;

a region determining process executed by the computer to determine an area on the screen large enough to contain the selected help text;

a position determining process executed by the computer to determine a position for the area on the screen, wherein the position does not cause the area to overlap the item;

a help text displaying process to display the help text within the area;

a linear pointer displaying process for displaying a linear pointer on the screen, wherein one end of the pointer is substantially near to the help text and wherein the other end of the pointer is substantially near to the referenced item thereby visually connecting the help text with the referenced item; and a final help text displaying process for displaying the selected help text in the determined position on the screen.

8. An apparatus for displaying help text on a display screen in a computer system comprising:

an item name display process executed by the computer system for displaying an item name on the display screen;

a first displaying process for displaying a first quantitative value expressed as a number on the display screen at a first position adjacent to the item name;

a first help text selecting process for selecting first help text associated with the first quantitative value expressed as a number;

a selected first help text displaying process for displaying the selected first help text on the display screen;

a linear pointer displaying process for displaying a linear pointer on the display screen, wherein one end of the pointer is substantially near to the selected first help text and the other end of the pointer is substantially near to the first quantitative value expressed as a number thereby visually connecting the first selected help text with the first quantitative value expressed as a number;

a second displaying process for displaying a second quantitative value expressed as a number on the display screen at the first position thereby replacing the first quantitative value expressed as a number, wherein the second quantitative value expressed as a number is different from the first quantitative value expressed as a number;

a second help text selecting process for selecting second help text associated with the second quantitative value expressed as a number;

a second help text displaying process for displaying the selected second help text on the display screen;

a second linear pointer displaying process for displaying a linear pointer on the display screen, wherein one end of the pointer is substantially near to the selected second help text and the other end of the pointer is substantially near to the second quantitative value expressed as a number thereby visually connecting the second selected help text with the second quantitative value expressed as a number; and a help text removing process for removing the selected help text from the determined position on the screen.

* * * * *